United States Patent
Zhang

(10) Patent No.: US 8,842,593 B2
(45) Date of Patent: Sep. 23, 2014

(54) METHOD FOR ACTIVATING MULTIMEDIA BROADCAST/MULTICAST SERVICE

(75) Inventor: Hai Zhang, Guangdong (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1409 days.

(21) Appl. No.: 10/594,646

(22) PCT Filed: Mar. 25, 2005

(86) PCT No.: PCT/CN2005/000382
§ 371 (c)(1),
(2), (4) Date: Jan. 29, 2007

(87) PCT Pub. No.: WO2005/099286
PCT Pub. Date: Oct. 20, 2005

(65) Prior Publication Data
US 2008/0232292 A1    Sep. 25, 2008

(30) Foreign Application Priority Data

Mar. 29, 2004 (CN) .......................... 2004 1 0031603

(51) Int. Cl.
*H04H 20/71* (2008.01)
*H04W 76/00* (2009.01)
*H04W 76/02* (2009.01)
*H04W 8/22* (2009.01)

(52) U.S. Cl.
CPC ............ *H04W 76/002* (2013.01); *H04W 76/02* (2013.01); *H04W 8/22* (2013.01)
USPC ......... 370/312; 370/328; 455/452.2; 455/453

(58) Field of Classification Search
USPC ............ 370/328, 312; 455/414.1, 445, 452.2, 455/453
See application file for complete search history.

(56) References Cited

U.S. PATENT DOCUMENTS 6,701,155 B2    3/2004    Sarkkinen et al.
2002/0054596 A1*    5/2002    Sengodan ................ 370/395.21
(Continued)

FOREIGN PATENT DOCUMENTS

| CN | 1452342 | 10/2003 |
|---|---|---|
| CN | 1457165 | 11/2003 |
| KR | 2004 0014706 | 2/2004 |

OTHER PUBLICATIONS

3rdGPP TS 23.246 V.6.1.0 (Dec. 2003)—"$3^{rd}$ Generation Partnership Project"; $3^{rd}$ Generation Partnership Project (3GPP); Technical Specification (TS), vol. 23.246, No. V610, Dec. 2003.
Universal Mobile Telecommunications System (UMTS) ETSI Standards, European Telecommunications Standards Institute, Sophia-Antipo, FR, vol. 3-SA1, No. V520, Mar. 2002.
Siemens; "Considerations on minimum capabilities of MBMS Ues", 3GPP TSG-RAN Working Group 2 Meeting #29 San Diego, USA Nov. 17-21, 2003.

(Continued)

*Primary Examiner* — Chuong A Ngo
(74) *Attorney, Agent, or Firm* — Leydig, Voit & Mayer, Ltd.

(57) ABSTRACT

The present invention discloses a method for activating a Multimedia Broadcast/Multicast Service (MBMS) comprising the steps: a. sending a message which carries MBMS bearer capabilities of a user equipment (UE) from the UE to a SGSN which the UE belongs to after passing authorization; b. verifying whether the MBMS bearer capabilities of the UE are less than Required MBMS Bearer Capabilities, if the SGSN has the Required MBMS Bearer Capabilities; and c. rejecting a request for activating an MBMS Context if the MBMS bearer capabilities of the UE are less than the Required MBMS Bearer Capabilities, or creating an MBMS UE Context if the MBMS bearer capabilities of the UE are not less than the Required MBMS Bearer Capabilities. The method can simplify the signaling interaction between the network entities, reduce the network complexity and save the network resources.

21 Claims, 11 Drawing Sheets

(56) References Cited

U.S. PATENT DOCUMENTS

| | | | |
|---|---|---|---|
| 2003/0194992 A1* | 10/2003 | Kim et al. | 455/414.1 |
| 2004/0073928 A1* | 4/2004 | Alakoski et al. | 725/62 |
| 2004/0085926 A1* | 5/2004 | Hwang et al. | 370/328 |
| 2004/0147266 A1* | 7/2004 | Hwang et al. | 455/445 |
| 2004/0266440 A1* | 12/2004 | Fuchs et al. | 455/445 |
| 2007/0201430 A1* | 8/2007 | Holmstrom et al. | 370/352 |

OTHER PUBLICATIONS

"3GPP TS 29.061—$3^{rd}$ Generation Partnership Project; Technical Specification Group Core Network; Interworking between the Public Land Mobile Network (PLMN) supporting packet based services and Packet Data Networks (PDN) (Release 1999)," Version 3.14.0, $3^{rd}$ Generation Partnership Project, Valbonne, France (Dec. 2003).

* cited by examiner

METHOD FOR ACTIVATING MULTIMEDIA BROADCAST/MULTICAST SERVICE

FIELD OF THE TECHNOLOGY INVENTION

The present invention relates to service activation technology, and in particular, to a method for realizing the Multimedia Broadcast/Multicast Service (MBMS) activation.

BACKGROUND OF THE INVENTION

Development of $3^{rd}$ Generation Mobile Communication Technology makes it possible to provide services with a higher data transfer speed than $2^{nd}$ Generation Mobile Communication does, and further support many new services, such as video telephone, downloading pictures and high speed Internet browsing, etc. Some services thereof have the following common features: it is possible to send corresponding data simultaneously to all subscribers who customized the service in radio network, for instance, sending weather forecast, short newsreel and sports performance collection etc. Based on the feature that data of these services can be sent at the same time, $3^{rd}$ Generation Mobile Communication introduces the concept of multicast/broadcast.

As shown in FIG. 1, for a middle node, for example, node 10, no matter how many downstream nodes expect to receive data, its upstream node always transmits one copy of the data to the middle node; after receiving the data, the middle node replicates the data into several copies according to the number of the downstream nodes that expect to receive the data and distributes the data to the each downstream node, for example, the downstream nodes of node 10 expecting to receive the data containing node 101 and node 102, so node 10 duplicates two copies of the received data. In this way, each branch of MBMS transmission tree has only one copy of data to transmit, sharing one copy of transmission source, and so does the data transmission of the root node and its downstream nodes. The difference between broadcast service and multicast service is: multicast service transmits corresponding information only to the subscribers who subscribed to particular information, while broadcast service transmits information to all the subscribers in radio network. It can be seen from the above description that providing the same information to a great number of subscribers through MBMS bearer service can save network sources greatly.

FIG. 2 illustrates the radio network architecture which supports MBMS bearer service, wherein the network entities include a Broadcast-Multicast Service Center (BM-SC) 201 which supports multicast/broadcast service, a Gateway GPRS Support Node (GGSN) 202, a Serving GPRS Support Node (SGSN) 203, a Universal Terrestrial Radio Access Network (UTRAN) 204 of Universal Mobile Telecommunication System (UMTS), a GSM/EDGE Radio Access Network (GERAN) 205 in Global System of Mobile communication (GSM) and User Equipment (UEs) 206 and 207. As shown in FIG. 2, in the conventional $3^{rd}$ Generation Partnership Project (3GPP) frame, BM-SC 201 is connected to GGSN 202 through a Gmb interface or a Gi interface, where one BM-SC 201 can be connected to several GGSNs as GGSN 202. GGSN 202 is connected to SGSN 203 through a Gn/Gp interface, where one GGSN 202 can be connected to several SGSNs as SGSNs 203. SGSN 203 can be connected to UTRAN 204 through an Iu interface and UTRAN 204 is connected to UE 206 through a Uu interface. SGSN 203 can also be connected to GERAN 205 through an Iu/Gb interface, and GERAN 205 is connected to UE 207 through a Um interface. The BM-SC can be a BSC/RNC.

Combining FIG. 1 and FIG. 2, BM-SC 201 is equivalent to a root node of a tree structure. The downstream node of BM-SC 201 is GGSN 202. The downstream node of GGSN 202 is SGSN 203. The downstream nodes of SGSN 203 are UEs 206 and 207. Of course, there can be more than one GGSNs and SGSNs. It is obvious that the data distribution of MBMS bearer service is implemented through a tree structure, which commonly implemented through multiple BSC/RNCs, SGSNs and GGSNs. Furthermore, some bearer resources are needed to be shared between subscribers who use a same MBMS bearer service. Therefore, a uniform QoS is created at each branch of the MBMS distribution tree. For above characteristics, when a new branch of the MBMS distribution tree is created, the QoS of the whole distribution tree should not be affected by this new branch. Accordingly, a QoS negotiation should not be implemented in UMTS network. If the network cannot accept QoS requirements of particular branches, as a result, these branches cannot be created. For instance, when the MBMS bearer capabilities of a particular UE are less than the Required MBMS Bearer Capabilities of a MBMS bear service, the UE will be rejected to use this MBMS bearer service by the network.

In current specification, the BM-SC can transmit the Required MBMS Bearer Capabilities corresponding to an MBMS bearer service through an MBMS Registration Procedure to a GGSN and a SGSN. The Required MBMS Bearer Capabilities may identify the minimum bearer capabilities requested by the UE when the UE receives the MBMS bearer service, that is, the maximum QoS ability that the MBMS bearer service possibly uses. When the UE joins the MBMS bearer service through an MBMS bearer service activation procedure, the network needs to verify whether the MBMS bearer capabilities of the UE satisfy the Required MBMS Bearer Capabilities.

The MBMS Bearer Context is used to store the Required MBMS Bearer Capabilities, which contain all the description information defining an MBMS bearer service and are created at all nodes that bear the MBMS data. As shown in Table 1, the MBMS Bearer Context includes an IP multicast address, an Access Point Name (APN), a Temporary Mobile Group Identification (TMGI), a State, a Required MBMS Bearer Capabilities, a QoS, an MBMS bearer service Area, a List of downstream nodes, a Number of UEs and so on. The IP multicast address identifies an MBMS bearer service described by this MBMS Bearer Context. The APN is an access point name on which this IP multicast address is defined. The TMGI is a temporary mobile group identity allocated to the MBMS bearer service. The State is the state of bearer plane resources, i.e., "Standby" or "Active" state. The Required MBMS Bearer Capabilities refer to the minimum bearer capabilities the UE needs to support. The QoS means Quality of Service required by the MBMS bearer service. The MBMS bearer service Area is the area over which the MBMS bearer service has to be distributed. The List of downstream nodes refers to the List of downstream nodes which requested the MBMS bearer service and to which notifications and MBMS data have to be distributed. The number of UEs means the number of UEs hosted by the node which joined the MBMS bearer service.

TABLE 1

| Parameter | Description | RAN | SGSN | GGSN | BM-SC |
|---|---|---|---|---|---|
| IP multicast address | IP multicast address identifying the MBMS bearer described by this MBMS Bearer Context. | X | X | X | X |
| APN | Access Point Name on which this IP multicast address is defined. | X | X | X | Undetermined |
| TMGI | Temporary Mobile Group Identity allocated to the MBMS bearer service. | X | X | X | X |
| State | State of bearer plane resources ('standby' or 'active') | Undetermined | X | X | X |
| Required MBMS Bearer Capabilities | Minimum bearer capabilities the UE needs to support | | X | X | X |
| QoS | Quality of Service required for the MBMS bearer service. | X | X | X | X |
| MBMS bearer service Area | Area over which the MBMS bearer service has to be distributed. | X | X | X | X |
| List of downstream nodes | List of downstream nodes that have requested the MBMS bearer service and to which notifications and MBMS data have to be forwarded. | | X | X | X |
| Number of UEs | Number of UEs hosted by the node that have joined the multicast MBMS bearer service. | Undetermined | X | X | Undetermined |

During the MBMS bearer service activation procedure, the subscriber is registered in the network to be enabled to receive data from a specific multicast MBMS bearer service. The activation is a signaling procedure between the UE and the network, which establishes an MBMS UE Context at UE, SGSN, GGSN and BSC/RNC for each activated multicast MBMS bearer service. The establishment of MBMS UE Context is similar as the establishment of general PDP context. The MBMS UE Context contains particular information of the particular MBMS bearer service which the UE joined. When the UE joins an MBMS bearer service, the MBMS UE Context is created at the UE, SGSN and GGSN. The MBMS UE Context is stored as part of the MM Context of the UE and is stored in the GGSN solely. There is one MBMS UE Context for each MBMS bearer service which the UE joined.

As shown in Table 2, the MBMS UE Context includes an IP multicast address, an APN, a TMGI, a (Network Service Access Point Identity) Linked NSAPI, an IMSI and the like. The IP multicast address identifies an MBMS bearer service which the UE joined. The APN is an access point name on which this IP multicast address is defined. The TMGI is a temporary mobile group identity allocated to the MBMS bearer service. The Linked NSAPI is the NSAPI of the PDP context used by the UE to carry an IGMP/MLD signaling. The IMSI is a subscriber identity. The MBMS_NSAPI is a Network layer Service Access Point Identifier which identifies an MBMS UE Context.

TABLE 2

| Parameter | Description | UE | SGSN | GGSN | RNC | BSC | BM-SC |
|---|---|---|---|---|---|---|---|
| IP multicast address | IP multicast address identifying an MBMS bearer that the UE has joined. | X | X | X | X | Iu - X Gb - none | X |
| APN | Access Point Name on which this IP multicast address is defined. | X | X | X | X | Iu - X Gb - none | X |
| GGSN Address in Use | The IP address of the GGSN currently used | | X | | | | |
| SGSN address | The IP address of SGSN | | | X | | | |
| TMGI | Temporary Mobile Group Identity allocated to the MBMS bearer. | X | X | | X | Iu - X Gb - none | |
| Linked NSAPI | NSAPI of the PDP context used by the UE to carry IGMP/MLD signalling. | X | X | | | | |
| IMSI | IMSI identifying the user. | (1) | (1) | X | (2) | Iu - (2) Gb - (3) | X |
| TI | Transaction Identifier | X | X | | | | |

TABLE 2-continued

| Parameter | Description | UE | SGSN | GGSN | RNC | BSC | BM-SC |
|---|---|---|---|---|---|---|---|
| MBMS_NSAPI | Network layer Service Access Point Identifier which identifies an MBMS UE Context. | X | X | X | X | | |

In table 2, (1) means that in the UE and SGSN, the IMSI is available within the MM Context which contains the MBMS UE Context. (2) means that the IMSI is available within the UE Context which contains the MBMS UE Context.

As shown in FIG. 3, the activating method of MBMS bearer service according to the prior art includes the steps of:

Step 301: In general, when a UE needs to activate a particular MBMS bearer service, it will create a PDP Context (PDP Context Activation) through an interaction with the network.

If the current UE has created the PDP Context with network, the created PDP Context is directly used. If the current UE has not created the PDP Context with network, the UE will activate a default PDP Context, the type of which is generally best effort. The PDP Context can be a PDP Context used in a basic IP service, such as WAP or Internet access, or can also be a signaling PDP Context used in an IP Multimedia Subsystem (IMS) access. In this embodiment, the GGSN corresponding to the default PDP Context is GGSN1.

Step 302: The current UE transmits an IGMP Joining or MLD Joining to GGSN1 through the created PDP Context, wherein in the message, a particular MBMS bearer service which is expected to receive by the subscriber is identified by the IP multicast address. If IPv4 protocols are adopted, the UE transmits an IGMP Joining to GGSN1. If IPv6 protocols are adopted, the UE transmits an MLD Joining to GGSN1. In this embodiment, IPv4 protocols are adopted.

Step 303: After receiving the IGMP/MLD Joining, GGSN1 transmits an MBMS Authorization Request to request the authorization for data reception of the current UE to a BM-SC. If the authorization request is passed, then the BM-SC transmits an MBMS Authorization Response to GGSN1, and the response carries the APN which is used to activate MBMS UE Context. If the authorization request is not passed, the MBMS Authorization Response transmitted from BM-SC to GGSN1 indicates that the UE cannot be authorized to receive MBMS data and the flow is ended.

Step 304: GGSN1 transmits an MBMS Notification Request to the SGSN, wherein the request includes an IP multicast address, an APN and a Linked NSAPI. The configuration of the Linked NSAPI equals to a PDP Context NASP1 used by GGSN1 when GGSN1 receives the Joining request. The IP multicast address is an IP multicast address in the Joining request of the UE. The APN is likely to be different from the APN of the activated default PDP Context, and under some circumstances, the APN possibly corresponds to another GGSN differing from GGSN1 which receives the IGMP/MLD Joining request. Since GGSN1 can not receive the response, for example the SGSN or the UE does not support the MBMS bearer service, and under these circumstances, GGSN1 needs to startup an MBMS Activation Timer.

Step 305: After receiving the MBMS Notification Request, the SGSN transmits an MBMS Context Activation Request to the UE, which is used to request the UE to activate an MBMS UE Context. The message at least carries an IP multicast address, an APN, a Linked NSAPI and a Transaction Identifier (TI). The Linked NSAPI allows the UE to associate the MBMS UE Context with the PDP context over which the UE sent the IGMP/MLD Joining in Step 302. The TI is selected by the SGSN, value of which is not used by other PDP Context or the MBMS UE Context activated by the UE.

Step 306: After creating the MBMS UE Context, the UE transmits an Activate MBMS Context Request to the SGSN, wherein the message includes an IP multicast address, an APN, an MBMS_NSAPI and MBMS bearer capabilities. The IP multicast address is used to identify startup joined/activated MBMS bearer service The APN indicates a particular GGSN. The MBMS bearer Capabilities are used to identify the maximum QoS which the UE can process. The MBMS_NSAPI is selected by the UE, value of which is not used by other PDP Context or MBMS UE Context activated by the UE.

Step 307: The SGSN transmits an MBMS Notification Response to GGSN1 which transmits an MBMS Notification Request in Step 304. An MBMS UE Context value is carried in this response and the MBMS UE Context value is used to indicate whether the MBMS UE Context is activated successfully. If the activation is not successful, the MBMS UE Context value indicates that failure of activating the MBMS UE Context is induced by entity of the SGSN or the UE. Once GGSN1 receives unsuccessful response message or the MBMS Activation Timer is overtime, the GGSN1 possibly will return back to the IP multicast access specifications described in 3GPP 29.061.

According to the description of IP multicast access specification described in 3GPP 29.061, under the circumstances of no MBMS bearer service, the GGSN has functions as an IP Multicast Agent, and the Point to Point (PTP) MBMS bearer service can be provided in UMTS network through the functions as follows:

a) a GGSN maintains a mobile station list including one or more multicast groups. When the GGSN receives an IGMP Joining or MLD Report from a mobile station, a list will be created/updated;

b) based on the maintained mobile station list, multicast routing information is transmitted to Packet Switched Domain routers to perform the routing of multicast packets;

c) once receiving the multicast packets, the GGSN will copy these packets and transmit the packets to each mobile station within the group through a PTP mode.

It is needed to explain that the MBMS bearer service is a type of User Service, which includes two implementing forms: an MBMS bearer service and a PTP unicast MBMS service.

Step 308: The SGSN implements such security functions as authentication to the current UE. This step can be omitted.

Step 309: After the SGSN confirms the particular GGSN which provides the requested MBMS bearer service according to the APN in Step 306, the SGSN creates an MBMS UE Context and transmits a Create MBMS Context Request to this GGSN. The Create MBMS Context Request includes an IP multicast address, an APN and an MBMS_NSAPI. In this embodiment, the GGSN practically providing the requested MBMS bearer service is GGSN2. Of course, GGSN1 and GGSN2 can be the same GGSN.

Step 310: GGSN2 transmits an MBMS Authorization Request to a BM-SC to quest the authorization for the UE, and the authorization judgment result is provided by an MBMS Authorization Response.

Step 311: If GGSN2 has no MBMS Bearer Context information of the MBMS bearer service, GGSN2 transmits an MBMS Registration Request to the BM-SC, and the corresponding procedures are described in MBMS registration procedure specification.

If the BM-SC has not assigned a TMGI for the MBMS bearer service, the BM-SC will assign a new TMGI which will be transferred to the GGSN and the SGSN through an MBMS Registration Response, further to the UE through an Activate MBMS Context Accept.

The BM-SC transmits MBMS Registration Response containing the MBMS Bearer Context of the MBMS bearer service to GGSN2 and adds GGSN2 to the List of downstream nodes of the MBMS Bearer Context. The corresponding procedures are described in MBMS registration procedure specification.

If GGSN2 has an MBMS Bearer Context of the MBMS bearer service, this step can be omitted.

Step 312: GGSN2 creates an MBMS UE Context and transmits a Create MBMS Context Response to the SGSN.

Step 313: If the SGSN has no MBMS Bearer Context of the MBMS bearer service, the SGSN will transmit an MBMS Registration Request to the GGSN, and the corresponding procedures are described in MBMS registration procedure specification.

GGSN2 responds an MBMS Registration Response, which includes the information of the MBMS Bearer Context of the MBMS bearer service, and adds the identification of the SGSN to the list of downstream nodes of the MBMS Bearer Context. The corresponding procedures are described in MBMS registration procedure specification. If the SGSN has an MBMS Bearer Context of the MBMS bearer service, this step can be omitted.

Step 314: If at least one Packet Switched Domain Radio Access bearer (PSRAB) is created for the UE, the SGSN provides the MBMS UE Context for the RAN.

Step 315: the SGSN transmits an Activate MBMS Context Accept to the UE which includes the MBMS Bearer Capabilities which is used to identify the maximum QoS of the MBMS bearer service. The UE may consider the MBMS bearer capabilities when it activates more MBMS bearer service. If the SGSN verifies that the MBMS bearer capabilities of the UE are less than Required MBMS Bearer Capabilities of current requested MBMS bearer service, the SGSN rejects the Activate MBMS Context Request, and indicates an indicated reason to start a deactivation process for the created MBMS UE Context.

It can be seen from the above flow, for the UE under all the circumstances, Step 315 must be the last step of the flow to verify whether the MBMS bearer capabilities of the UE are less than Required MBMS Bearer Capabilities of the current requested MBMS bearer service. For the UE that cannot meet the demand, since all bearers have been created for the UE through above procedures, a deactivation procedure is needed to be initiated to the UE.

As a network node without storing the Required MBMS Bearer Capabilities will have the Required MBMS Bearer Capabilities information just after once registration, if the procedure for a network node judging whether MBMS bearer capabilities of other UE are less than the Required MBMS Bearer Capabilities when other UE implements MBMS bearer service activation still carries out according to the above steps when other UE accesses, the steps are so complicated that network signaling interactions are increased and network efficiency is reduced.

It is mentioned in the Step 307 that the GGSN possibly returns back to the IP multicast access specifications described in 3GPP 29.061, but the IP multicast access specifications described in 3GPP 29.061 adopt PTP mode, which cannot save network resources and radio interface resources as PTM mode. Furthermore, during the above procedures, for the rejected UEs, no scheme of adopting other mechanisms to make the rejected subscribers receive requested MBMS bearer service is proposed, so the subscriber's satisfaction is greatly reduced.

SUMMARY OF THE INVENTION

In view of the above, the present invention is to provide a method to implement MBMS activation, make the network process the request of the UE MBMS bearer capabilities of which are less than those demanded, thereby simplifying signaling alternation between network entities, reducing network complexity and saving network resources.

In accordance with the present invention, a method for activating a Multimedia Broadcast/Multicast Service (MBMS) includes the steps:

a. sending a message which carries MBMS bearer capabilities of a user equipment (UE) from the UE to a SGSN which the UE belongs to after passing authorization;

b. verifying whether the MBMS bearer capabilities of the UE are less than Required MBMS Bearer Capabilities, if the SGSN has the Required MBMS Bearer Capabilities; and c. rejecting a request for activating an MBMS Context if the MBMS bearer capabilities of the UE are less than the Required MBMS Bearer Capabilities, or creating an MBMS UE Context if the MBMS bearer capabilities of the UE are not less than the Required MBMS Bearer Capabilities.

The Step a includes:

a1. creating a Packet Data Protocol (PDP) Context through interaction with a network and sending a joining message to the network via the SGSN which the UE belongs to; and a2. receiving the joining message, implementing an authorization verification to the UE, and permitting the UE to activate an MBMS UE Context and send the message which carries the MBMS bearer capabilities of the UE to the SGSN which the UE belongs to if the UE passes authorization;

Rejecting the request for activating the MBMS context in the step c, further includes:

c11. sending a rejection message which carries a rejection reason to the UE;

c12. sending a failure message which carries a failure reason to a GGSN; and c13. receiving the failure message and deciding whether to return back to an IP multicast access of a unicast mode.

Or, rejecting the request for activating the MBMS context in the step c, further includes:

c21. sending a rejection message which carries a rejection reason to the UE; and c22. receiving the rejection message and reapplying to receive the MBMS bearer service through a unicast mode.

Preferably, rejecting the request for activating the MBMS context in the step c, further includes:

c31. sending a failure message which carries a failure reason to a GGSN; and c32. receiving the failure message and deciding whether to return back to an IP multicast access of a unicast mode.

Or, rejecting the request for activating the MBMS context in the step c, further includes:

c41. sending a failure message which carries a failure reason to a GGSN; and c42. receiving the failure message and deciding whether to return back to an IP multicast access of a unicast mode; and c43. sending a rejection message which carries a rejection reason to the UE.

In the above scheme, the rejection message sent to the UE further carries the Required MBMS Bearer Capabilities.

Preferably, the method further includes:

receiving the rejection message;

activating a timer;

verifying whether the GGSN having returned back to the IP multicast access of the unicast mode before time-out of the timer, stopping the timer if the GGSN having returned back to the IP multicast access of the unicast mode before time-out of the timer, and reapplying to receive the MBMS bearer service through the unicast mode if the timer being overtime.

Preferably, the method further includes:

activating a timer after the step a of sending the message which carries the MBMS bearer capabilities of the UE, stopping the timer if the UE receives an accepting message or the GGSN returns back to the IP multicast access of the unicast mode before time-out of the timer, and reapplying to receive the MBMS bearer service through the unicast mode if the timer being overtime.

In the above scheme, the rejection message carries the Required MBMS Bearer Capabilities, the UE compares the Required MBMS Bearer Capabilities with the MBMS bearer capabilities of the UE after receiving the rejection message, and the UE reapplies to receive the MBMS bearer service through the unicast mode if the MBMS bearer capabilities of the UE are less than the Required MBMS Bearer Capabilities.

In the above scheme, the rejection message carries the Required MBMS Bearer Capabilities, the UE compares the Required MBMS Bearer Capabilities with the MBMS bearer capabilities of the UE after receiving the rejection message, and the UE reapplies to receive the MBMS bearer service through the unicast mode if the MBMS bearer capabilities of the UE are less than the Required MBMS Bearer Capabilities and the GGSN does not return back to the IP multicast access of the a unicast mode.

In the Step b, if the SGSN has not the Required MBMS Bearer Capabilities and if the MBMS bearer capabilities of the UE are less than the Required MBMS Bearer Capabilities, the SGSN deactivates the created MBMS UE Context, and sends a failure message to a GGSN; the GGSN receives the failure message and decides whether to return back to an IP multicast access of a unicast mode.

Preferably, the method further includes:

receiving a rejection message sent from the SGSN;

activating a timer;

verifying whether the GGSN having returned back to the IP multicast access of the unicast mode before time-out of the timer, stopping the timer if the GGSN having returned back to the IP multicast access of the unicast mode before time-out of the timer, and reapplying to receive the MBMS bearer service through the unicast mode if the timer being overtime.

In the above scheme, the SGSN sends the failure message to the GGSN which creates a PDP Context with the UE, or to the GGSN which creates an MBMS UE Context with the UE.

Preferably, the method further includes:

sending a rejection message to the UE if the MBMS bearer capabilities of the UE are less than the Required MBMS Bearer Capabilities.

The rejection message carries the Required MBMS Bearer Capabilities, the UE compares the Required MBMS Bearer Capabilities with the MBMS bearer capabilities of the UE after receiving the rejection message, and the UE reapplies to receive the MBMS bearer service through the unicast mode if the MBMS bearer capabilities of the UE are less than the Required MBMS Bearer Capabilities and the GGSN does not return back to the IP multicast access of the unicast mode.

In the Step b, if the SGSN has no the Required MBMS Bearer Capabilities, the SGSN creates an MBMS UE Context; if the MBMS bearer capabilities of the UE are less than the Required MBMS Bearer Capabilities, the UE reapplies to receive the MBMS bearer service through the unicast mode after the SGSN deactivates the created MBMS UE Context or after the UE receives a rejection message sent from the SGSN.

The rejection message sent from the SGSN to the UE carries the Required MBMS Bearer Capabilities; the UE compares the Required MBMS Bearer Capabilities with the MBMS bearer capabilities of the UE after receiving the rejection message, and the UE reapplies to receive the MBMS bearer service through the unicast mode if the MBMS bearer capabilities of the UE are less than the Required MBMS Bearer Capabilities.

In the method for implementing the MBMS bearer service Activation provided in the present invention, when a UE activates a particular MBMS bearer service, after receiving the MBMS bearer capabilities of the UE during the procedure that the UE creates a PDP Context with the network, a SGSN verifies whether the MBMS bearer capabilities of the UE satisfy the Required MBMS Bearer Capabilities. Therefore, under the circumstance of the SGSN or the GGSN is unregistered, whether the MBMS bearer capabilities of the UE satisfy the Required MBMS Bearer Capabilities will be known after finishing the whole existing MBMS bearer service activation procedure while under the circumstance of the SGSN or the GGSN is registered, if the MBMS bearer capabilities of the UE cannot satisfy the Required MBMS Bearer Capabilities, the MBMS UE Context need not be created at all. In this way, complex signaling interaction between the UE and the network is omitted and another activation operation after Activate MBMS UE Context is avoided, thereby the network process is simplified and the network load is reduced.

In practical applications of the present invention, verifying together by the SGSN and the UE can be an alternative, which can ensure reliability of the verification result and make the activation flow of the MBMS bearer service more flexible and diversified.

In addition, for the UE of which the MBMS bearer capabilities do not satisfy the Required MBMS Bearer Capabilities, the SGSN can reject directly or change the mode of providing service. The changing the mode of service providing is: the GGSN goes back to IP multicast access specifications described in 3GPP 29.061 on its initiative, making the UE receive the MBMS bearer service through a PTP mode; or the UE reapplies to receive the MBMS bearer service through a unicast mode on its initiative. In this way, the denied subscribers can receive their requested MBMS bearer service through other approaches. Thereby the subscriber satisfaction and the network utilization coefficient will be improved and the income of network operators will be increased; furthermore, the receiving method of MBMS bearer service becomes more flexible and diversified.

EMBODIMENTS OF THE INVENTION

According to the core idea of present invention, when a UE activates a particular MBMS bearer service, after receiving the MBMS bearer capabilities of the UE during the procedure that the UE creates PDP Context with the network, a SGSN verifies whether the MBMS bearer capabilities of the UE satisfy the demand and then implements corresponding process according to the verification result. In this way, the request of activating MBMS bearer service can be processed in advance.

Figure 4:
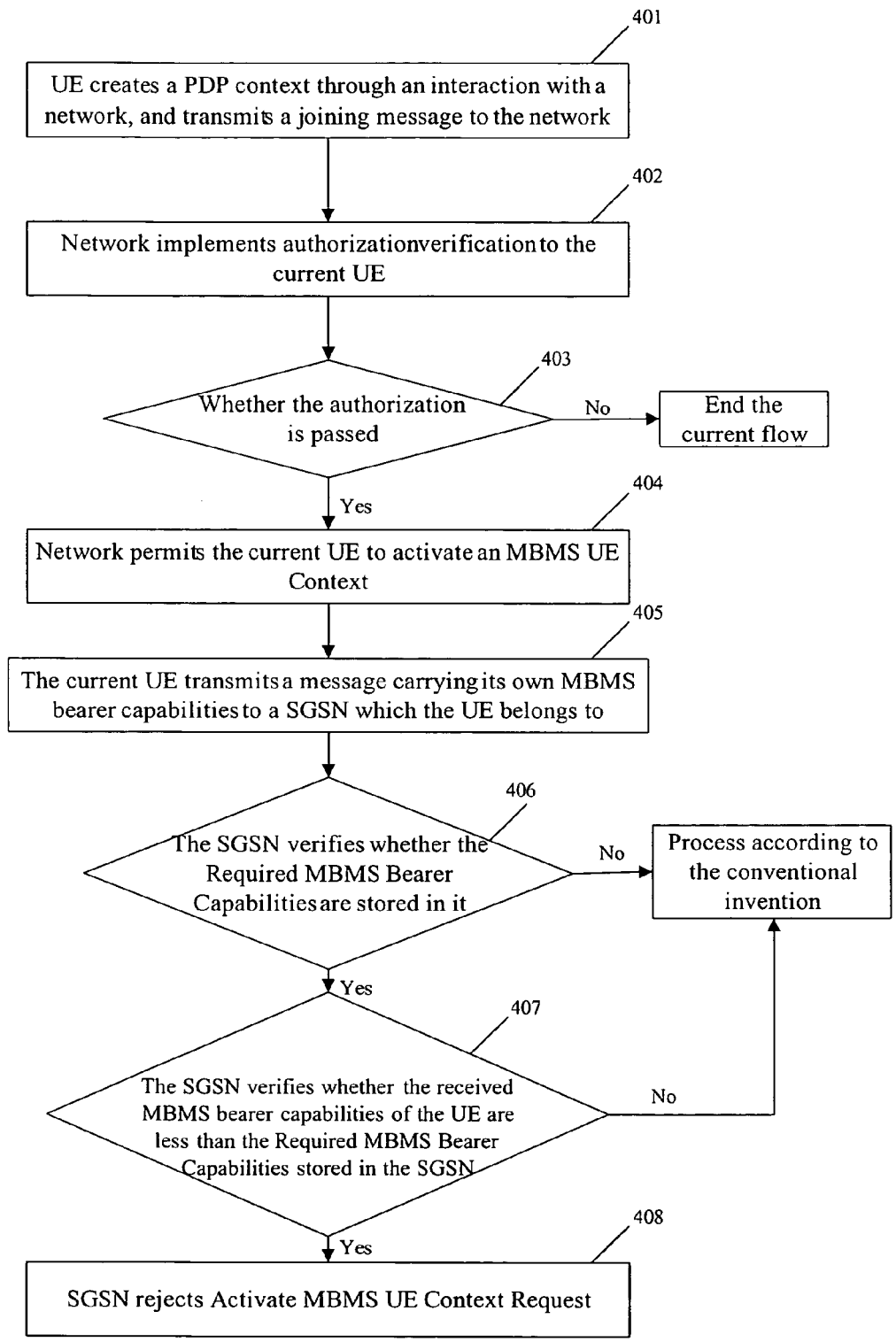
FIG. 4 illustrates a preferred processing flow of the method for activating an MBMS bearer service according to present invention.

As shown in FIG. 4, a method for activating the MBMS service according to the invention includes steps of:

Step 401: A UE requesting to receive a particular MBMS bearer service first creates a PDP Context with network through a SGSN that the UE belongs to, and transmits a joining message to the network through the created PDP Context. Generally, the UE transmits the joining message to the GGSN corresponding to the created PDP Context.

Steps 402~405: The network implements the authorization verification to the current UE transmitting the joining message. If the authorization is passed, the network permits the UE to activate the MBMS UE Context, and the current UE transmits a message carrying its own MBMS bearer capabilities to the SGSN which it belongs to. If the authorization is not passed, end the current process.

Figure 1:
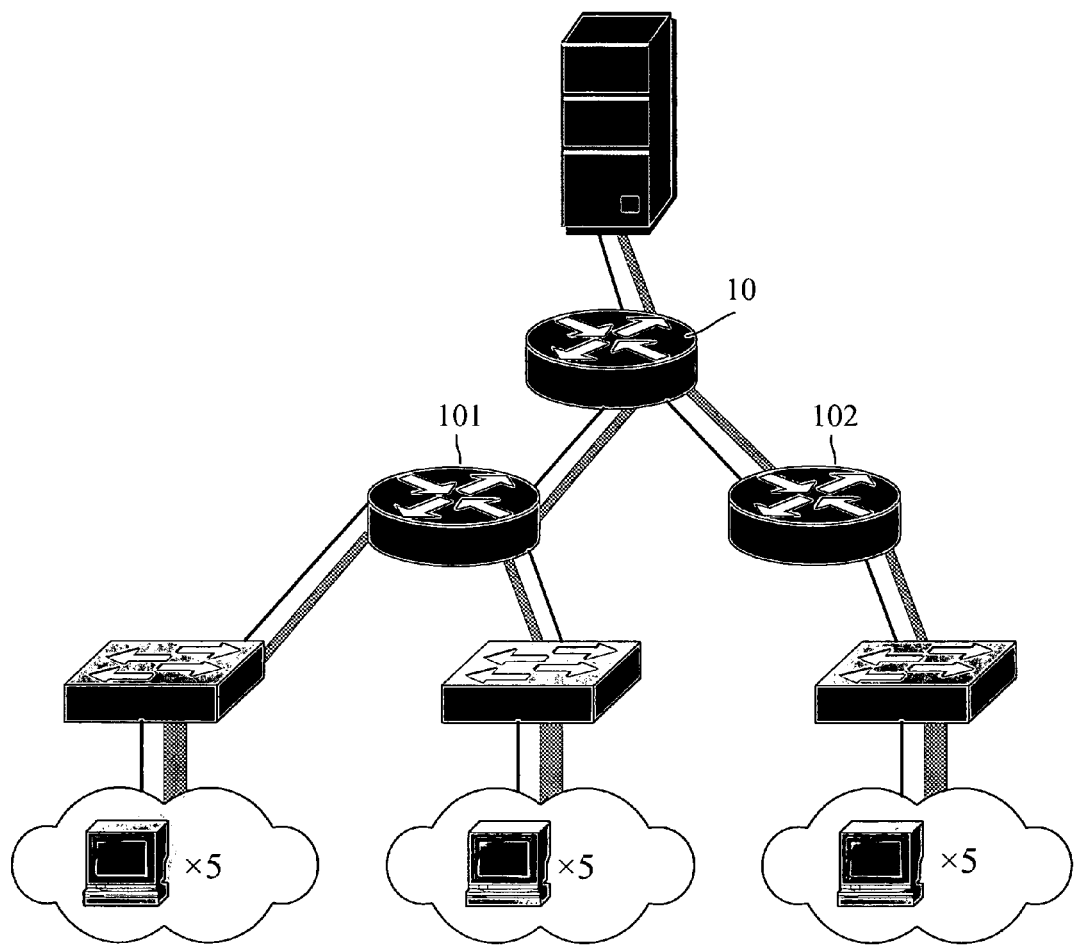
FIG. 1 illustrates a transmission mechanism of the Multicast Service.
Figure 2:
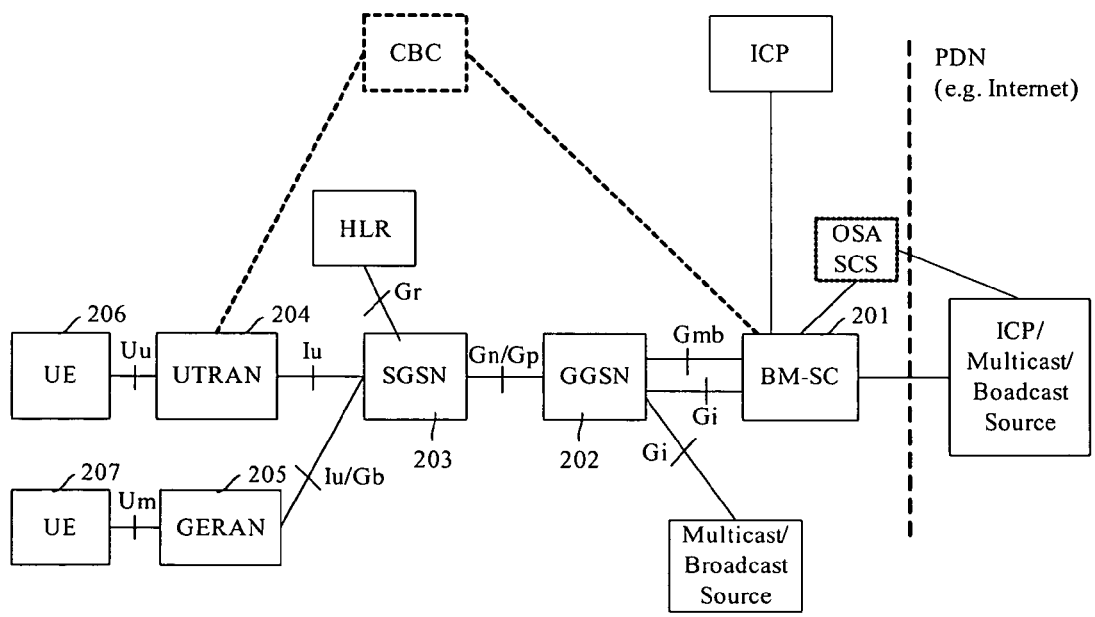
FIG. 2 illustrates an architecture of the radio network supporting an MBMS bearer service.
Figure 3:
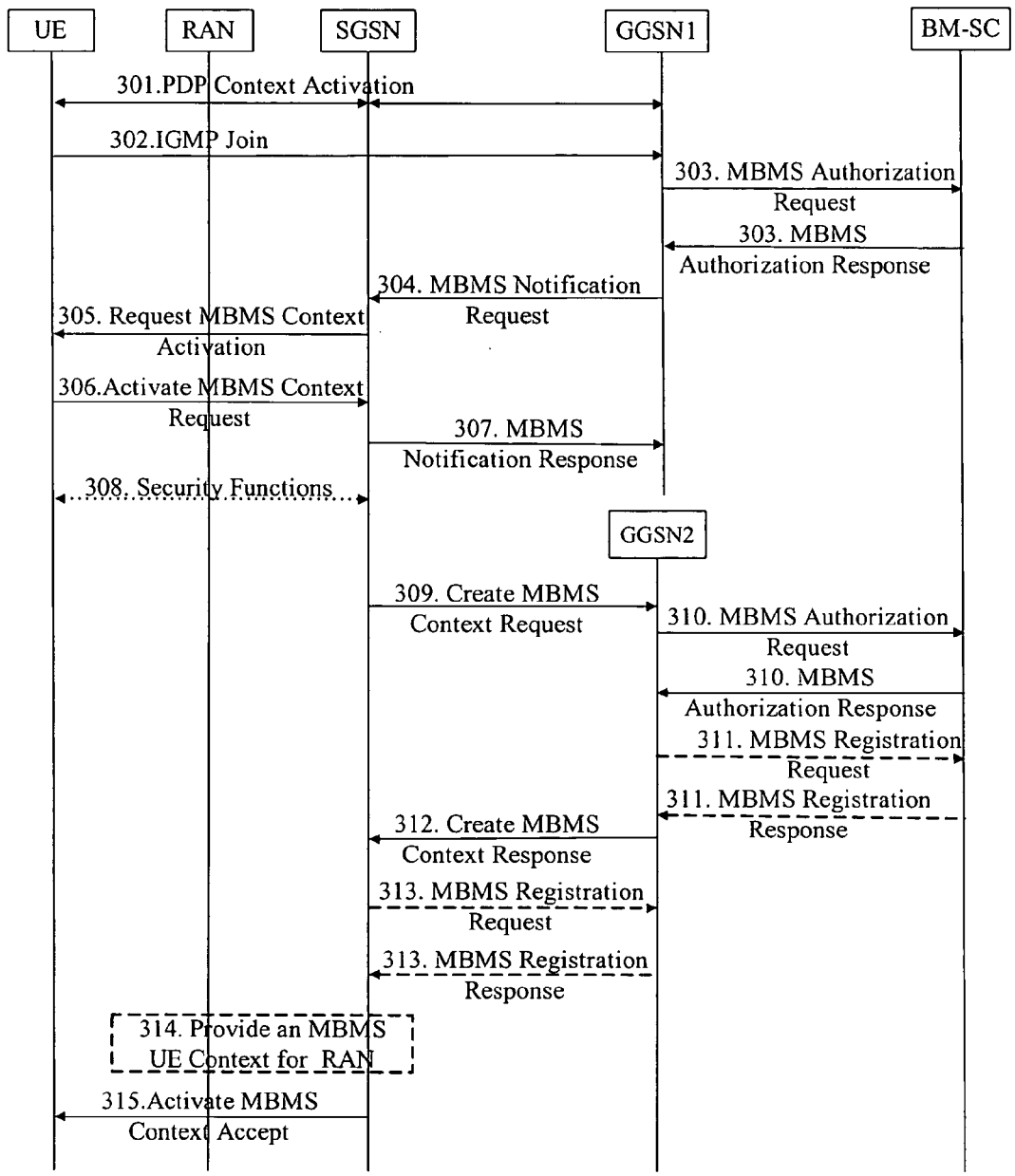
FIG. 3 illustrates a processing flow of MBMS bearer service activation according to conventional invention.

The detailed procedures of the network implementing authorization verification to the current UE is as shown in Steps 303~306 in FIG. 3. After receiving the joining message transmitted by the current UE, the GGSN transfers an MBMS Authorization Request to the BM-SC to request authorization for data reception of the current UE. After implementing authorization verification to the current UE, the BM-SC returns an MBMS Authorization Response to the GGSN. If the authorization verification is passed, a special GGSN APN response message is carried in the MBMS Authorization Response. After receiving the MBMS Authorization Response, the GGSN transmits an MBMS Notification Request to the SGSN. After receiving the MBMS Notification Request, the SGSN requests the current UE for activating the MBMS UE Context. After receiving the request, the UE returns a response message carrying its own MBMS bearer capabilities. If the authorization verification is not passed, the MBMS Authorization Response carries an indication that the current UE cannot receive MBMS data, and the current process flow is ended.

Step 406: After receiving the MBMS bearer capabilities of the UE, the SGSN verifies whether the Required MBMS Bearer Capabilities are stored in it. If the Required MBMS Bearer Capabilities are stored, Step 407 is implemented; otherwise, the conventional MBMS bearer service activation flow according to Steps 307~315 as shown in FIG. 3 is implemented and the current process flow is ended.

In general, there are two approaches for a SGSN to obtain the Required MBMS Bearer Capabilities of a particular MBMS bearer service. Obtain through Registration procedure or through network configuration set by the network operator. For the first circumstance that no Required MBMS Bearer Capabilities required by the MBMS bearer service are stored in the SGSN and GGSN only exists when the SGSN and GGSN registers for a first time. After the SGSN and GGSN finishes registration, the Required MBMS Bearer Capabilities of the MBMS bearer service will be stored in the corresponding SGSN and GGSN.

Steps 407~408: The SGSN verifies whether the received MBMS bearer capabilities of the UE are less than the Required MBMS Bearer Capabilities which are stored in the SGSN. If the MBMS bearer capabilities of the UE are less than the Required MBMS Bearer Capabilities, the SGSN rejects the Activate MBMS UE Context Request. If the MBMS bearer capabilities of the UE are not less than the Required MBMS Bearer Capabilities, go on with the conventional MBMS bearer service activating flow according to Steps 307~315 as shown in FIG. 3 to finish the MBMS UE Context Creation. The step for verifying the MBMS bearer capabilities of the UE is no longer implemented in Step 315.

In Step 408, after rejecting the Activate MBMS UE Context Request, the SGSN also can transmit an Activate MBMS UE Context Failure to the GGSN or the UE respectively or inform the GGSN and the UE at the same time. The GGSN or the UE can retransform or reapply the receiving mode of the MBMS bearer service according to its requirements.

The Activate MBMS UE Context Failure from the SGSN to the GGSN can directly adopt an MBMS Notification Response according to conventional invention, and the activation failure indication is carried by the response message; an individual message also can be adopted to indicate that activating MBMS UE Context is unsuccessful.

Embodiment 1

Figure 5:
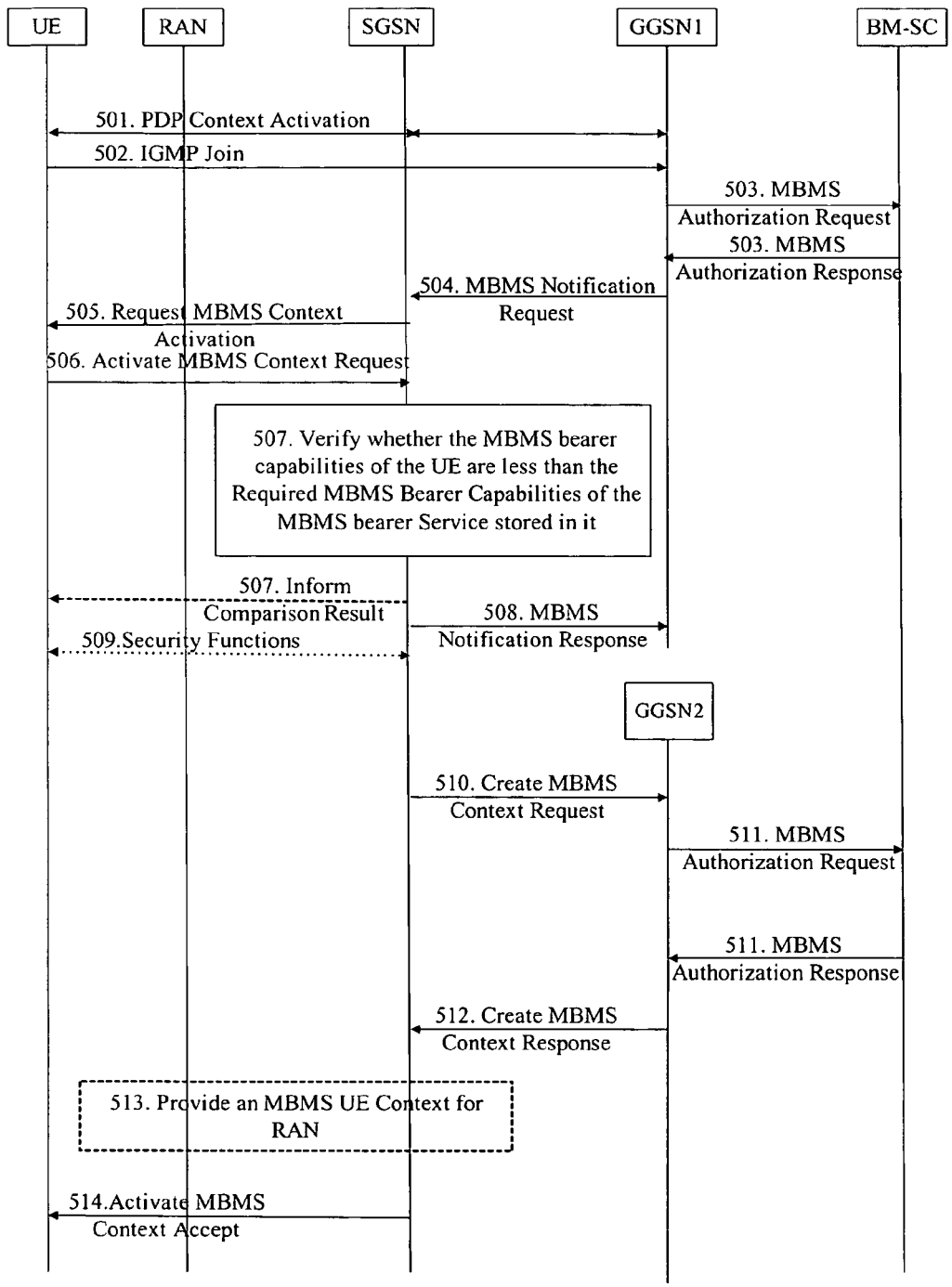
FIG. 5 illustrates a preferred processing flow of Embodiment 1 according present invention.

In this embodiment, the corresponding Required MBMS Bearer Capabilities have been stored in the SGSN. After the SGSN receiving the MBMS bearer capabilities of the UE, a verification result is obtained: the MBMS bearer capabilities of the UE are more than or equal to the Required MBMS Bearer Capabilities. Under this circumstance, the implementing method of the MBMS bearer service activation is as shown in FIG. 5, including steps of:

Steps 501~506: are completely the same as all the descriptions in Steps 301~306 according to conventional invention.

Step 507: After receiving an Activate MBMS Context Request carrying the MBMS bearer capabilities from the UE which transmits a joining message currently, the SGSN verifies whether the MBMS bearer capabilities of the UE are less than the Required MBMS Bearer Capabilities of the MBMS bearer service stored in it. If the MBMS bearer capabilities of the UE are more than or equal to the Required MBMS Bearer Capabilities of the MBMS bearer service, the SGSN informs the current UE that its MBMS bearer capabilities satisfy the demand. Step 508 is implemented. Of course, the verification result can also not be informed to the UE, and the Step 508 is directly implemented.

Steps 508~511: are completely the same as all the descriptions in Steps 307~310 according to conventional invention.

Step 512: is completely the same as all the description in Step 312 according to conventional invention.

Step 513: is completely the same as all the description in Step 314 according to conventional invention.

Step 514: the SGSN transmits an Activate MBMS Context Accept to the UE, which contains the MBMS bearer capabilities which is used to identify the maximum QoS of the MBMS bearer service. The UE may consider the MBMS bearer capabilities when it activates more MBMS bearer service.

Embodiment 2

Figure 6:
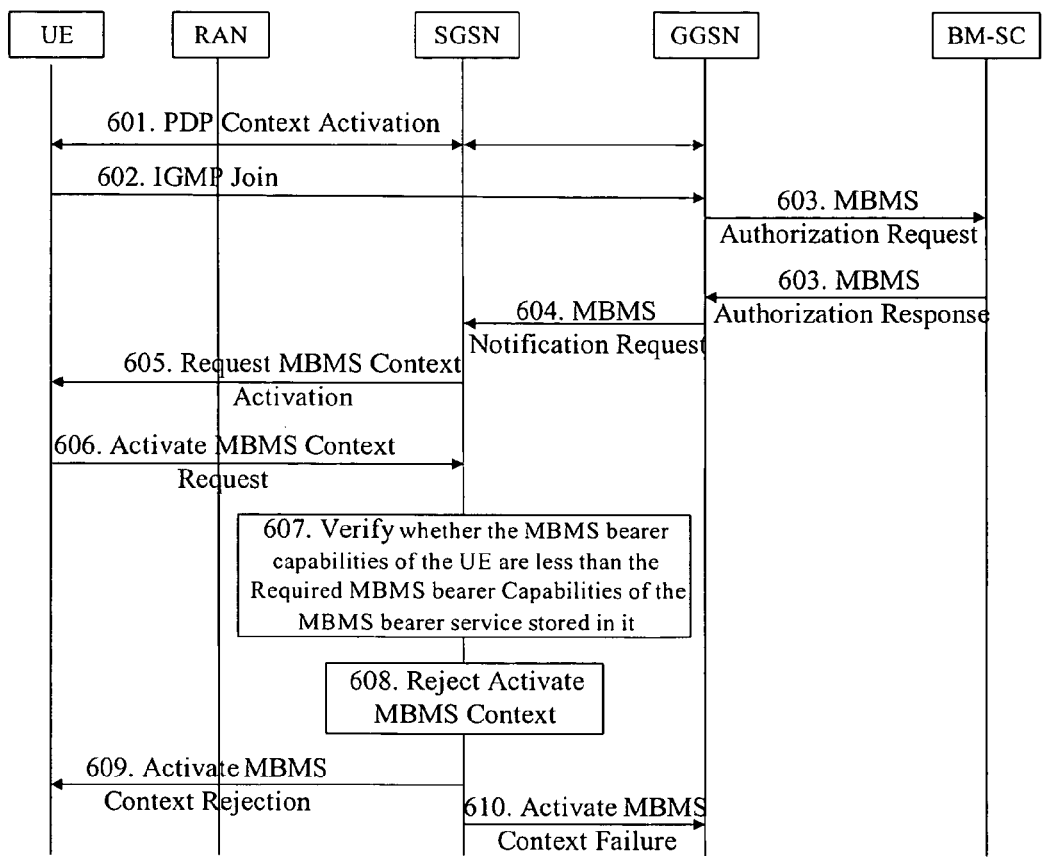
FIG. 6 illustrates a preferred processing flow of Embodiment 2 according present invention.

In this embodiment, the corresponding Required MBMS Bearer Capabilities have been stored in the SGSN. After the SGSN receives the MBMS bearer capabilities of the UE, a verification result that the MBMS bearer capabilities of the UE are less than the Required MBMS Bearer Capabilities is obtained. After obtaining the verification result, the SGSN rejects the Activate MBMS Context Request and transmits an Activate MBMS Context Rejection to the UE at the same time, and the SGSN transmits an Activate MBMS Context Failure to the GGSN. Under these circumstances, the activating method of the MBMS bearer service is as shown in FIG. 6, including steps of:

Steps 601~606: are completely the same as all the descriptions in Steps 301~306 according to conventional invention.

Step 607~608: After receiving the Activate MBMS Context Request carrying the MBMS bearer capabilities from the UE which transmits a joining message currently, the SGSN verifies whether the MBMS bearer capabilities of the UE are less than the Required MBMS Bearer Capabilities of the MBMS bearer service stored in it. If the MBMS bearer capabilities of the UE are less than the Required MBMS Bearer Capabilities of the MBMS bearer service, the SGSN rejects the current Activate MBMS Context Request.

Step 609: The SGSN transmits an Activate MBMS Context Rejection to the UE, which indicates through an indicated reason why the MBMS UE Context could not be activated and may also carry the Required MBMS Bearer Capabilities of the requested MBMS bearer service.

Step 610: The SGSN transmits an Activate MBMS Context Failure to the GGSN, indicating that the failure is induced by the bearer capabilities. The GGSN decides whether to return back to IP multicast access specifications described in 3GPP 29.061 according to practical situation.

Embodiment 3

Figure 7:
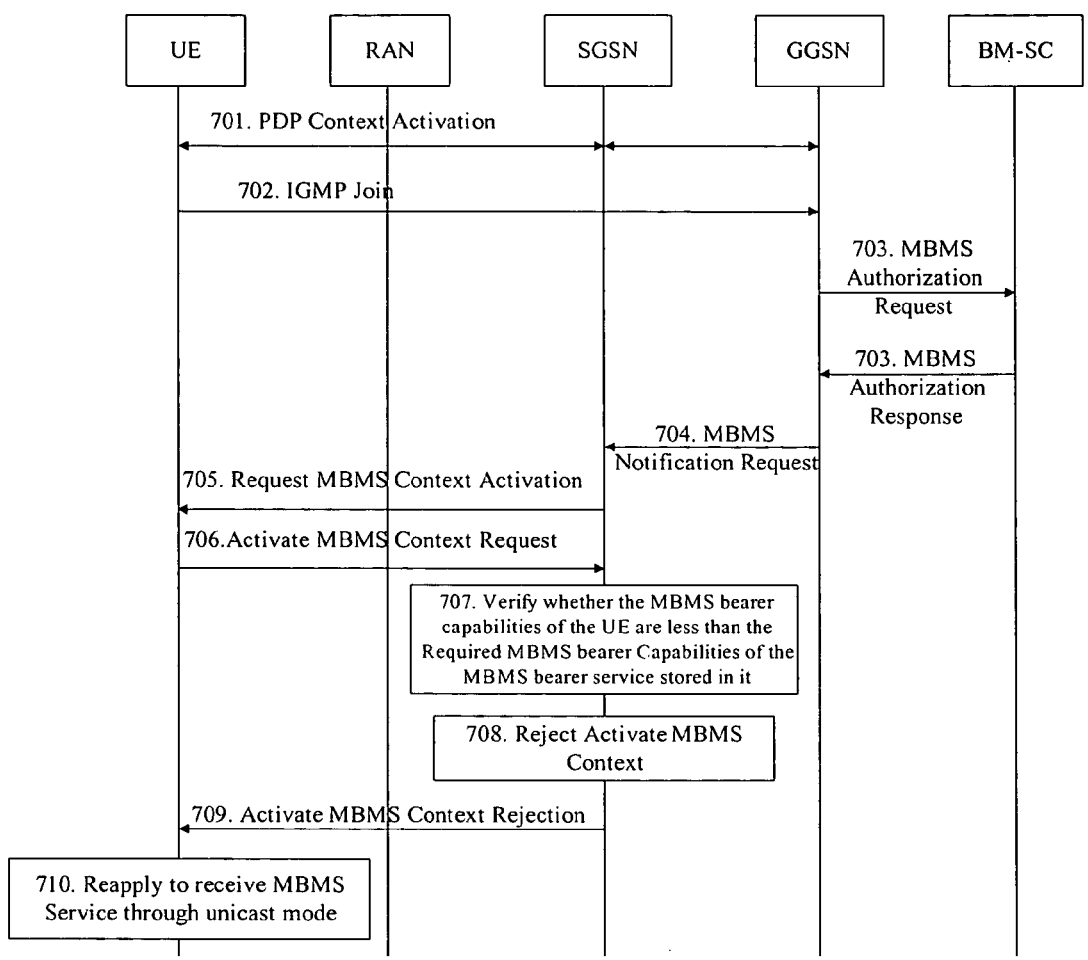
FIG. 7 illustrates a preferred processing flow of Embodiment 3 according present invention.

In this embodiment, the corresponding Required MBMS Bearer Capabilities have been stored in the SGSN. After the SGSN receives the MBMS bearer capabilities of the UE, a verification result that the MBMS bearer capabilities of the UE are less than the Required MBMS Bearer Capabilities is obtained. After obtaining the verification result, the SGSN only transmits an Activate MBMS Context Request Rejection to the UE. Under these circumstances, the activating method of the MBMS bearer service is as shown in FIG. 7, including steps of:

Steps 701~708: are completely the same as all the descriptions in Steps 601~608 of Embodiment 2.

Step 709: The SGSN transmits an Activate MBMS Context Rejection to the UE, which indicates through an indicated reason why the MBMS UE Context could not be activated and may also carry the Required MBMS Bearer Capabilities of the requested MBMS bearer service.

Step 710: After receiving the Activate MBMS Context Rejection, the UE reapplies to carry out IP multicast access specifications described in 3GPP 29.061, adopting unicast mode, i.e., PTP mode to receive the requested MBMS bearer service.

With respect to this embodiment, if the Activate MBMS Context Rejection which is transmitted from the SGSN to the UE in Step 709 carries the Required MBMS Bearer Capabilities of the requested MBMS bearer service. Then the UE also can compare the Required MBMS Bearer Capabilities with its own MBMS bearer capabilities once more after receiving the Activate MBMS Context Rejection. After obtaining a verification result that its own MBMS bearer capabilities are less than the Required MBMS Bearer Capabilities, the UE reapplies to receive the requested MBMS bearer service through unicast mode which is described in 3GPP 29.061.

Embodiment 4

Figure 8:
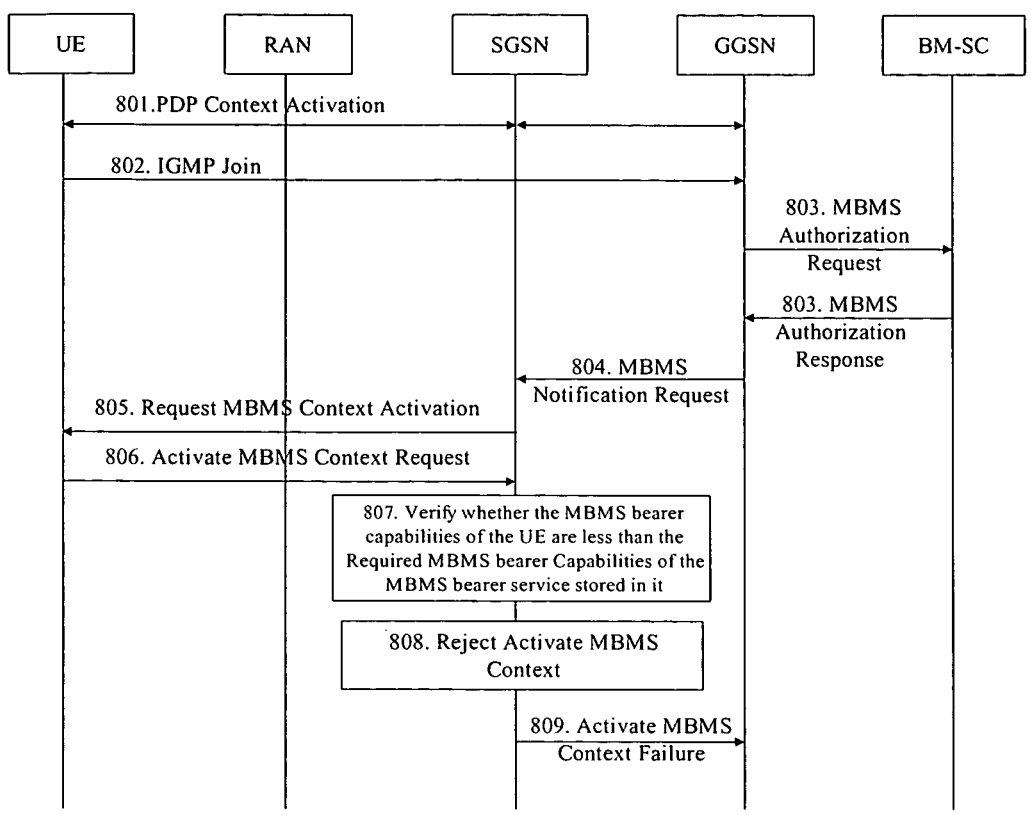
FIG. 8 illustrates a preferred processing flow of Embodiment 4 according present invention.

In this embodiment, the corresponding Required MBMS Bearer Capabilities have been stored in the SGSN. After the SGSN receives the MBMS bearer capabilities of the UE, a verification result that the MBMS bearer capabilities of the UE are less than the Required MBMS Bearer Capabilities is obtained. After obtaining the verification result, the SGSN rejects MBMS Context Request, and then transmits an Activate MBMS Context Failure to the GGSN. Under this circumstance, the implementing method of the MBMS bearer service activation is as shown in FIG. 8, including steps of:

Steps 801~808: are completely the same as all the descriptions in Steps 601~608 of Embodiment 2.

Step 809: The SGSN transmits an Activate MBMS Context Failure to the GGSN, indicating that the failure is induced by the bearer capabilities. The GGSN decides whether to go back to IP multicast access specifications described in 3GPP 29.061 according to practical situation.

Embodiment 5

Figure 9:
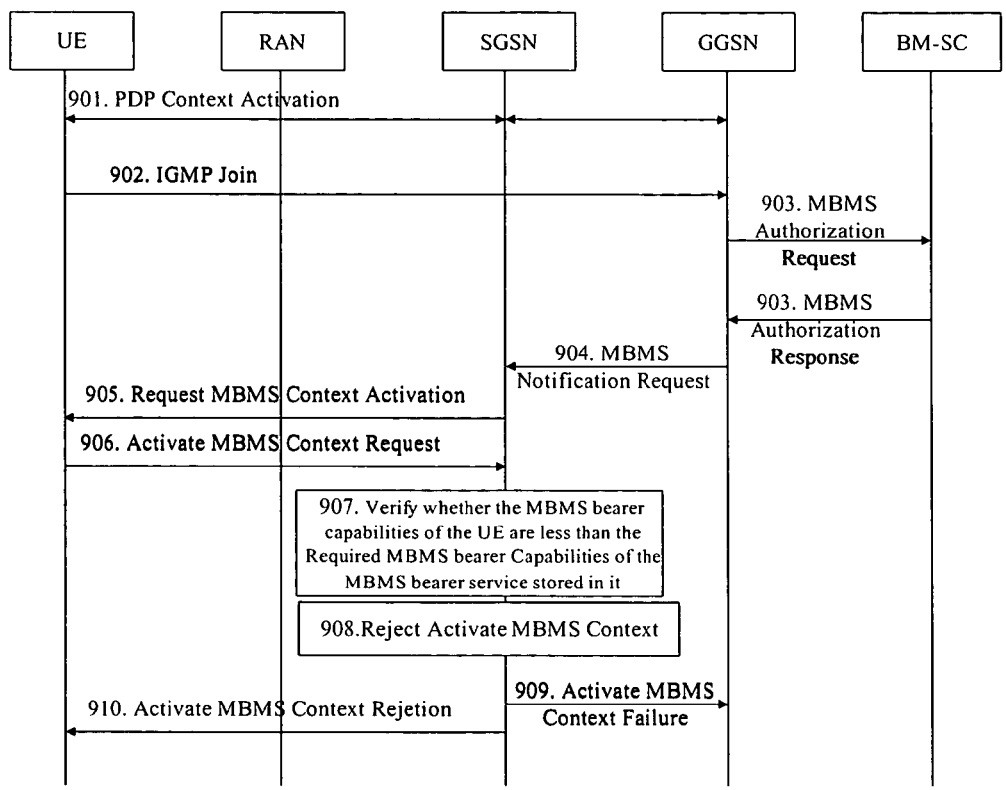
FIG. 9 illustrates a preferred processing flow of Embodiment 5 according present invention.

In this embodiment, the corresponding Required MBMS Bearer Capabilities information has been stored in the SGSN. After the SGSN receives the MBMS bearer capabilities of the UE, a verification result that the MBMS bearer capabilities of the UE are less than the Required MBMS Bearer Capabilities is obtained After obtaining the verification result, the SGSN rejects the Activate MBMS Context Request, transmits an Activate MBMS Context Failure to the GGSN, and then transmits an Activate MBMS Context Rejection to the UE. Under this circumstance, the activating method of the MBMS bearer service is as shown in FIG. 9, including steps of:

Steps 901~908: are completely the same as all the descriptions in Steps 601~608 of Embodiment 2.

Step 909: The SGSN transmits an Activate MBMS Context Failure to the GGSN, indicating that the failure is induced by the bearer capabilities. The GGSN decides whether to return back to IP multicast access specifications described in 3GPP 29.061 according to practical situation.

Step 910: The SGSN transmits an Activate MBMS Context Rejection to the UE, which indicates through an indicated reason why the MBMS UE Context could not be activated and may also carry the Required MBMS Bearer Capabilities of the requested MBMS bearer service.

In above five embodiments, for embodiment 2 and embodiment 5, the last step is that the SGSN transmits an Activate MBMS Context Failure to the GGSN, and the GGSN possibly goes back to IP multicast access specifications described in 3GPP 29.061. For the circumstances that the GGSN does not return back, after the UE receiving Activate MBMS Context Rejection message transmitted from the SGSN, the UE also can activate a Timer, start timing and verify whether the GGSN to return back at the same time. If the GGSN returns back before time-out of the Timer, the Timer is stopped; if the Timer is overtime, the UE reapplies to carry out IP multicast access specifications described in 3GPP 29.061, adopting unicast mode, i.e., PTP mode to receive the requested MBMS bearer service.

For Embodiment 4, after transmitting Activate MBMS Context Request to the SGSN, the UE activates a Timer and starts timing. If the UE receives the Activate MBMS Context Accept or the GGSN returns back to IP multicast access before time-out of the Timer, the Timer is stopped. If the UE does not receive the Activate MBMS Context Accept and the GGSN does not return back to IP multicast access before time-out of the Timer, the UE reapplies to carry out IP multicast access specifications described in 3GPP 29.061, adopting unicast mode, i.e., PTP mode to receive the requested MBMS bearer service.

For Embodiment 2 and Embodiment 5, if the Activate MBMS Context Rejection which is transmitted from the SGSN to the UE carries the Required MBMS Bearer Capabilities of the requested MBMS bearer service. Then UE also can compare the Required MBMS Bearer Capabilities with its own MBMS bearer capabilities once again after receiving the Activate MBMS Context Rejection; after obtaining a verification result that its own MBMS bearer capabilities are less than the Required MBMS Bearer Capabilities, if the GGSN does not return back to IP multicast access, the UE reapplies to receive the requested MBMS bearer service through a unicast mode.

Embodiment 6

Figure 10:
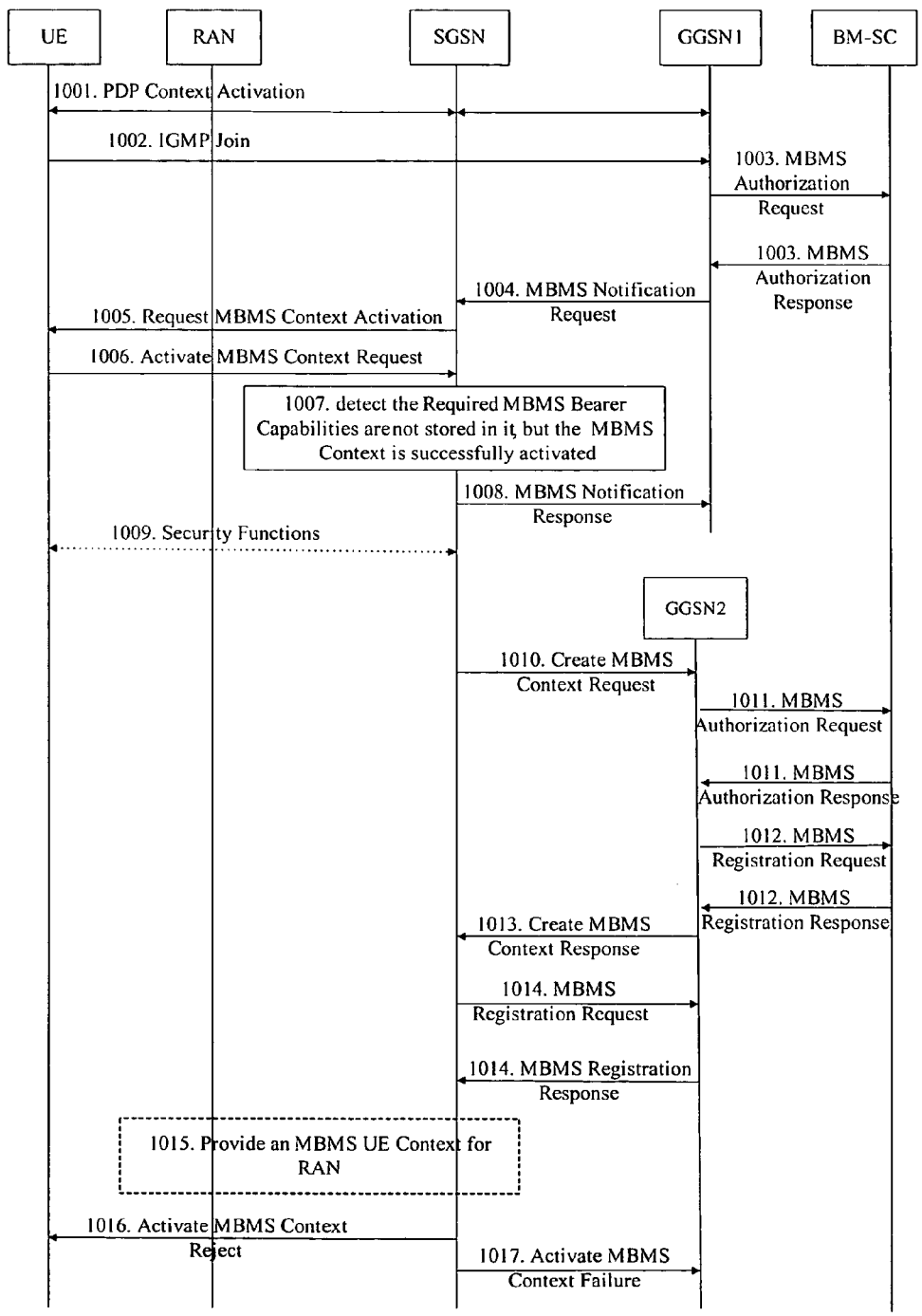
FIG. 10 illustrates a preferred processing flow of Embodiment 6 according present invention.

In this embodiment, the corresponding MBMS bearer capabilities have not been stored in the SGSN, and the MBMS UE Context is activated successfully, then the procedures follow the conventional invention. Furthermore, for the circumstance that the MBMS bearer capabilities of the UE are less than the Required MBMS Bearer Capabilities, the SGSN not only deactivates the created MBMS UE Context, but also transmits an Activate MBMS Context Failure to the GGSN. And then the GGSN decides whether to return back to IP multicast access specifications described in 3GPP 29.061 according to practical situation. Under this circumstance, the activating method of the MBMS bearer service is as shown in FIG. 10, including steps of:

Steps 1001~1006: are completely the same as all the descriptions in Steps 301~306 according to conventional invention.

Steps 1007~1008: the SGSN detects the corresponding Required MBMS Bearer Capabilities are not stored in it. After receiving the Activate MBMS Context Request which carries the MBMS bearer capabilities of the UE and is transmitted from the UE that is currently transmitting a joining message. In such circumstance, the SGSN has not registered and cannot verify whether the MBMS bearer capabilities of the UE satisfy the demand. So the SGSN directly returns an MBMS Notification Response to GGSN1 which transmits MBMS Notification Request. The response carries an indicated reason, and the MBMS UE Context is used to indicate whether the MBMS UE Context is activated successfully and if it is failure, the MBMS UE Context further indicates the failure is induced by the SGSN or the UE. In this embodiment, the response indicates that the MBMS UE Context has been activated successfully.

Steps 1009~1015 are basically as same as all the descriptions in Steps 308~314 according to conventional invention, and, Step 1012 and Step 1014 cannot be omitted.

Step 1016: The SGSN verifies whether the MBMS bearer capabilities of the UE are less than the Required MBMS Bearer Capabilities of the requested MBMS bearer service according to its stored MBMS bearer capabilities. If the MBMS bear capabilities are not less than the Required MBMS Bearer Capabilities, the SGSN transmits an Activate MBMS Context Accept carrying the MBMS bearer capabilities to the UE, and the current process flow is ended. In this step, the MBMS bearer capabilities are used to identify the maximum QoS of the MBMS bearer service. The UE is likely to consider the MBMS bearer capabilities when it activates more MBMS bearer services.

If the MBMS bearer capabilities of the UE are less than the Required MBMS Bearer Capabilities of the current MBMS bearer service, the SGSN rejects the Activate MBMS UE Context Request, and transmits an Activate MBMS Context Reject message which indicates an indicated reason and deactivates the created MBMS UE Context, and then implements Step 1017. In this embodiment, the MBMS bearer capabilities of the UE are less than the Required MBMS Bearer Capabilities of the current MBMS bearer service.

Step 1017: After deactivating the MBMS UE Context, the SGSN transmits an Activate MBMS Context Failure to GGSN1 or GGSN2, indicating that the failure is induced by the MBMS bearer capabilities. GGSN1 or GGSN2 decides whether to return back to IP multicast access specifications described in 3GPP 29.061 according to practical situation.

In this embodiment, with respect to the circumstances that the GGSN does not return back, after receiving the Activate MBMS Context Rejection transmitted from the SGSN in Step 1016, the UE activate a Timer, start timing and verify whether the GGSN to returns back at the same time. If the GGSN returns back before time-out of the Timer, the Timer is stopped. If the Timer is overtime, the UE reapplies to carry out IP multicast access specifications described in 3GPP 29.061, adopting unicast mode, i.e., PTP mode to receive the requested MBMS bearer service.

In this embodiment, if the Activate MBMS Context Rejection which is transmitted from the SGSN to the UE carries the Required MBMS Bearer Capabilities of the requested MBMS bearer service in Step 1016. Then the UE can also compare the Required MBMS Bearer Capabilities with its own MBMS bearer capabilities once again after receiving the Activate MBMS Context Rejection. After obtaining a verification result that its own MBMS bearer capabilities are less than the Required MBMS Bearer Capabilities, if it is detected that the GGSN does not returns back to IP multicast access, the UE reapplies to receive the requested MBMS bearer service through a unicast mode.

Embodiment 7

Figure 11:
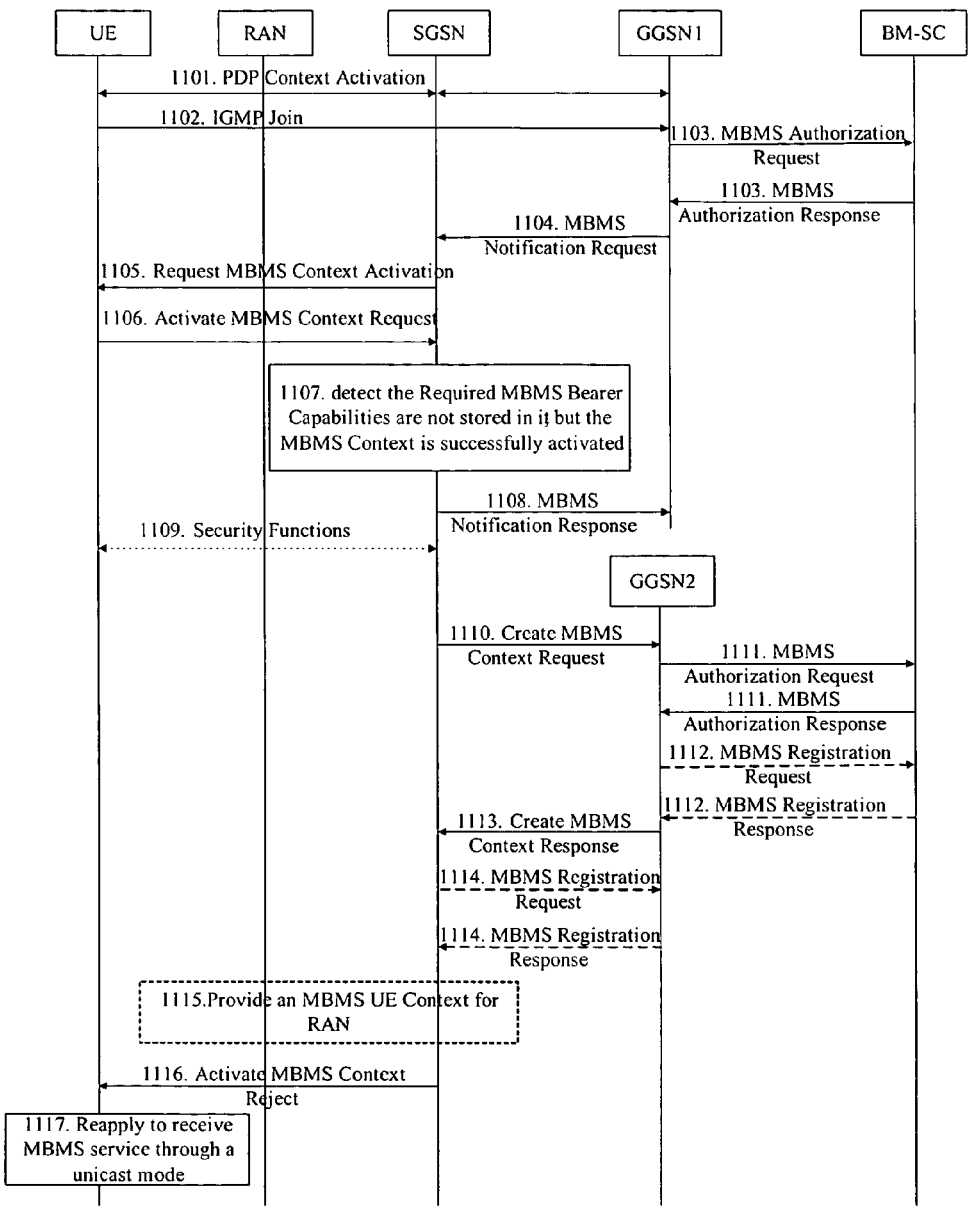
FIG. 11 illustrates a preferred processing flow of Embodiment 7 according present invention.

In this embodiment, the corresponding Required MBMS Bearer Capabilities are not stored in the SGSN, but the MBMS UE Context is activated successfully. The procedures follow the conventional invention, and the MBMS bearer capabilities of the UE are verified in the last step. Furthermore, for the circumstance that the MBMS bearer capabilities of the UE are less than the Required MBMS Bearer Capabilities, the SGSN not only deactivates the created MBMS UE Context, but also reapplies to receive the current MBMS bearer service through a unicast mode when it receives an Activate MBMS Context Rejection. Under this circumstance, the activating method of the MBMS bearer service is as shown in FIG. 11, including steps of:

Steps 1101~1116: are completely the same as all the descriptions in Steps 1001~1016 of Embodiment 6.

Step 1117: After receiving the Activate MBMS Context Rejection or deactivating the MBMS UE Context, the UE reapplies to carry out IP multicast access specifications described in 3GPP 29.061, adopting unicast mode, i.e., PTP mode to receive the requested MBMS bearer service.

In this embodiment, if the Activate MBMS Context Rejection transmitted from the SGSN to the UE carries the Required MBMS Bearer Capabilities of the requested MBMS bearer service in Step 1116. The UE also can compare the Required MBMS Bearer Capabilities with its own MBMS bearer capabilities once again after receiving the Activate MBMS Context Rejection. After obtaining a verification result that its own MBMS bearer capabilities are less than the Required MBMS Bearer Capabilities, if the GGSN does not return back to the IP multicast access, the UE reapplies to receive the requested MBMS bearer service through a unicast mode.

Of course, for the circumstances of embodiment 6 and embodiment 7, the activating flow of the MBMS bearer service can also be ended after deactivation procedures, omitting Step 1017 or Step 1117.

The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

The invention claimed is:

1. A method for activating a Multimedia Broadcast/Multicast Service (MBMS) in a network, the network comprising at least one Serving GPRS Support Node (SGSN) for connecting user equipments (UE) via a radio access network, at least one GGSN, and at least one BM-SC, wherein the SGSN and the GGSN are operatively connected while the GGSN and the BM-SC are operatively connected;

the method comprising the steps:

a1. creating, by a UE, a Packet Data Protocol (PDP) Context through interaction with the network and sending a joining message to the network via an SGSN which the UE belongs to; and a2. after receiving the joining message, implementing, by the network, an authorization to the UE, if the UE has passed the authorization, permitting the UE to activate an MBMS UE Context and the UE sending a request for activating an MBMS Context which carries MBMS bearer capabilities of the UE to the SGSN which the UE belongs to;

b. verifying, by the SGSN before sending a Create MBMS Context Request, whether the MBMS bearer capabilities of the UE are less than Required MBMS Bearer Capabilities if the SGSN has the Required MBMS Bearer Capabilities, wherein the Required MBMS Bearer Capabilities are used to identify the maximum QoS ability of the MBMS service requested by the UE; and c. rejecting, by the SGSN, the request for activating an MBMS Context if the MBMS bearer capabilities of the UE are less than the Required MBMS Bearer Capabilities, or creating the MBMS UE Context if the MBMS bearer capabilities of the UE are not less than the Required MBMS Bearer Capabilities.

2. The method according to claim 1, wherein rejecting the request for activating the MBMS context in the step c, further comprises:

c11. sending a rejection message which carries a rejection reason to the UE;

c12. sending a failure message which carries a failure reason to a GGSN; and c13. receiving the failure message and deciding whether to return back to an IP multicast access of a unicast mode.

3. The method according to claim 2, further comprising:
receiving the rejection message:
activating a timer,
verifying whether the GGSN having returned back to the IP multicast access of the unicast mode before time-out of the timer, stopping the timer if the GGSN having returned back to the IP multicast access of the unicast mode before time-out of the timer, and reapplying to receive the MBMS bearer service through the unicast mode if the timer being overtime.

4. The method according to claim 2, wherein the rejection message carries the Required MBMS Bearer Capabilities, the UE compares the Required MBMS Bearer Capabilities with the MBMS bearer capabilities of the UE after receiving the rejection message, and the UE reapplies to receive the MBMS bearer service through the unicast mode if the MBMS bearer capabilities of the UE are less than the Required MBMS Bearer Capabilities and the GGSN does not return back to the IP multicast access of the a unicast mode.

5. The method according to claim 1, wherein rejecting the request for activating the MBMS context in the step c, further comprises:

c21. sending a rejection message which carries a rejection reason to the UE; and c22. receiving the rejection message and reapplying to receive the MBMS bearer service through a unicast mode.

6. The method according to claim 5, wherein the rejection message carries the Required MBMS Bearer Capabilities, the UE compares the Required MBMS Bearer Capabilities with the MBMS bearer capabilities of the UE after receiving the rejection message, and the UE reapplies to receive the MBMS bearer service through the unicast mode if the MBMS bearer capabilities of the UE are less than the Required MBMS Bearer Capabilities.

7. The method according to claim 1, rejecting the request for activating the MBMS context in the step c, further comprises:

c31. sending a failure message which carries a failure reason to a GGSN; and c32. receiving the failure message and deciding whether to return back to an IP multicast access of a unicast mode.

8. The method according to claim 7 further comprising: activating a timer after the step a2 of sending the message which carries the MBMS bearer capabilities of the UE, stopping the timer if the UE receives an accepting message or the GGSN returns back to the IP multicast access of the unicast mode before time-out of the timer, and reapplying to receive the MBMS bearer service through the unicast mode if the timer being overtime.

9. The method according to claim 1, rejecting the request for activating the MBMS context in the step c, further comprises:
   c41. sending a failure message which carries a failure reason to a GGSN;
   c42. receiving the failure message and deciding whether to return back to an IP multicast access of a unicast mode; and
   c43. sending a rejection message which carries a rejection reason to the UE.

10. The method according to claim 9, further comprising:
   receiving the rejection message;
   activating a timer;
   verifying whether the GGSN having returned back to the IP multicast access of the unicast mode before time-out of the timer, stopping the timer if the GGSN having returned back to the IP multicast access of the unicast mode before time-out of the timer, and reapplying to receive the MBMS bearer service through the unicast mode if the timer being overtime.

11. The method according to claim 9, wherein the rejection message carries the Required MBMS Bearer Capabilities, the UE compares the Required MBMS Bearer Capabilities with the MBMS bearer capabilities of the UE after receiving the rejection message, and the UE reapplies to receive the MBMS bearer service through the unicast mode if the MBMS bearer capabilities of the UE are less than the Required MBMS Bearer Capabilities and the GGSN does not return back to the IP multicast access of the unicast mode.

12. The method according to claim 1, wherein in the Step b, if the SGSN has not the Required MBMS Bearer Capabilities and if the MBMS bearer capabilities of the UE are less than the Required MBMS Bearer Capabilities, the SGSN deactivates the created MBMS UE Context, and sends a failure message to a GGSN; the GGSN receives the failure message and decides whether to return back to an IP multicast access of a unicast mode.

13. The method according to claim 12, further comprising:
   receiving a rejection message sent from the SGSN;
   activating a timer;
   verifying whether the GGSN having returned back to the IP multicast access of the unicast mode before time-out of the timer, stopping the timer if the GGSN having returned back to the IP multicast access of the unicast mode before time-out of the timer, and reapplying to receive the MBMS bearer service through the unicast mode if the timer being overtime.

14. The method according to claim 12, wherein the SGSN sends the failure message to the GGSN which creates a PDP Context with the UE, or to the GGSN which creates an MBMS UE Context with the UE.

15. The method according to claim 12, further comprising:
   sending a rejection message to the UE if the MBMS bearer capabilities of the UE are less than the Required MBMS Bearer Capabilities.

16. The method according to claim 15, wherein the rejection message carries the Required MBMS Bearer Capabilities, the UE compares the Required MBMS Bearer Capabilities with the MBMS bearer capabilities of the UE after receiving the rejection message, and the UE reapplies to receive the MBMS bearer service through the unicast mode if the MBMS bearer capabilities of the UE are less than the Required MBMS Bearer Capabilities and the GGSN does not return back to the IP multicast access of the unicast mode.

17. The method according to claim 1, wherein in Step b, if the SGSN has no the Required MBMS Bearer Capabilities, the SGSN creates an MBMS UE Context; if the MBMS bearer capabilities of the UE are less than the Required MBMS Bearer Capabilities, the UE reapplies to receive the MBMS bearer service through the unicast mode after the SGSN deactivates the created MBMS UE Context or after the UE receives a rejection message sent from the SGSN.

18. The method according to claim 17, wherein the rejection message sent from the SGSN to the UE carries the Required MBMS Bearer Capabilities; the UE compares the Required MBMS Bearer Capabilities with the MBMS bearer capabilities of the UE after receiving the rejection message, and the UE reapplies to receive the MBMS bearer service through the unicast mode if the MBMS bearer capabilities of the UE are less than the Required MBMS Bearer Capabilities.

19. A Serving GPRS Support Node (SGSN) for activating a Multimedia Broadcast/Multicast Service (MBMS) comprising:
   a first unit, adapted to receive a message which carries MBMS bearer capabilities of a user equipment (UE) from the UE after the UE has passed an authorization;
   a second unit, adapted to verify, before the SGSN sending a Create MBMS Context Request, whether the MBMS bearer capabilities of the UE are less than Required MBMS Bearer Capabilities when the SGSN knows the Required MBMS Bearer Capabilities; and
   a third unit, adapted to reject a request for activating an MBMS Context If the MBMS bearer capabilities of the UE are less than the Required MBMS Bearer Capabilities, or create an MBMS UE Context if the MBMS bearer capabilities of the UE are not less than the Required MBMS Bearer Capabilities.

20. The SGSN according to claim 19, further comprising:
   a fourth unit, adapted to send a rejection message which carries a rejection reason to the UE.

21. The SGSN according to claim 19, further comprising:
   a fifth unit, adapted to send a failure message which carries a failure reason to a Gateway GPRS Support Node (GGSN).

* * * * *